United States Patent Office 3,313,841
Patented Apr. 11, 1967

3,313,841
2-PROPYNYL ESTER OF (p-[DI-PROPYNYLAMI-NO]PHENYL MERCAPTO) ACETIC ACID
Chester E. Pawloski, Bay City, Mich., assignor to The Dow Chemical Company, Midland, Mich., a corporation of Delaware
No Drawing. Filed Dec. 26, 1963, Ser. No. 333,700
1 Claim. (Cl. 260—470)

The present invention is directed to a compound corresponding to the formula

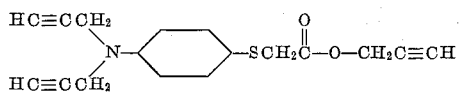

This compound is a liquid which is somewhat soluble in many organic solvents and of low solubility in water. The compound has been found to be useful as a pesticide for the control of various insect, mite, worm, bacterial and fungal organisms such as roundworms, beetles, roaches, mites and bacteria.

The new compound can be prepared by reacting together p-aminophenylmercapto acetic acid and propargyl halide such as propargyl bromide or propargyl chloride. The reaction is carried out in the presence of a weakly basic material and preferably in a liquid reaction medium such as isopropanol, acetone, or methyl ethyl ketone. The reaction takes place smoothly at temperatures at which the halide of reaction is produced and preferably from about 0–100° C. The halide of reaction appears in the reaction mixture as the salt of the metal cation from the employed base. Good results are obtained when employing one molecular proportion of p-aminomercapto acetic acid and at least one molecular proportion preferably an excess, of each of the propargyl halide and the basic material. However, the reaction consumes the reactants in molecular proportions of 3 moles propargyl bromide and 3 moles of basic material such as an alkali metal carbonate for every mole of p-aminophenylmercapto acetic acid and the use of amounts which represent such proportions is preferred. Upon completion of the reaction the desired product may be separated and purified by conventional procedures.

In carrying out the reaction the propargyl halide and p-aminophenylmercapto acetic acid and basic material are combined in any convenient manner. In a preferred procedure the reactants are dispersed in an organic solvent as reaction medium and the temperature elevated to and maintained at the reaction temperature until there is a substantial cessation in the formation of the halide of reaction. The reaction mixture can be filtered hot and the filtrate employed in pesticidal compositions or heated to remove the low boiling constituents before being so employed. However, is is preferable to add to the reaction mixture, at the end of the long heating period, a solution of aqueous sodium hydroxide. The reaction mixture is then heated for a short period of time. The hot reaction mixture can then be filtered, washed with water and the organic layer which was obtained during the washing procedure heated to remove the low boiling constituents.

In a representative operation, p-aminophenylmercapto acetic acid (50 grams), propargyl bromide (102 grams) and potassium carbonate (120 grams) were dispersed in 500 milliliters of acetone and the resulting mixture heated at the boiling temperature and under reflux for 24 hours. Twenty grams of sodium hydroxide in 60 milliliters of water was then added to the reaction mixture and the mixture heated for another two hours. The reaction mixture was then filtered hot and washed with water. During the washing procedure the mixture separated into an aqueous and an organic layer. The organic layer was collected and heated to remove the low boiling constituents leaving the 2-propynyl(p-[di-2-propynylamino] phenyl mercapto)acetate as a dark red liquid having a refractive index n/D of 1.5920 at 25° C.

The novel product of the present invention is useful as a pesticide for the control of the growth and killing of a number of plant and animal organisms. For such uses, the product is dispersed on a finely divided solid such as chalk, talc or bentonite and employed as a dust. Such mixtures may also be dispersed in water with or without the aid of a surface active agent and the resulting aqueous suspension employed as a spray. In other procedures, the product is employed as the active constituent in solvent solution such as oil-in-water or water-in-oil emulsions or aqueous dispersions which can be employed as a spray, drench or wash. In representative operations the novel compound of this invention, when employed in concentrations of 600 parts per million by weight, gives 100 percent kills of pig ascarids and mouse tapeworms.

I claim:
2-propynyl(p - [di-2-propynylamino]phenyl mercapto) acetate.

No references cited.

LORRAINE A. WEINBERGER, *Primary Examiner.*
R. K. JACKSON, *Assistant Examiner.*